(12) United States Patent
Sakagami et al.

(10) Patent No.: US 7,044,830 B2
(45) Date of Patent: May 16, 2006

(54) NUMERIC CONTROLLER

(75) Inventors: Makoto Sakagami, Tokyo (JP); Masaki Ryu, Tokyo (JP)

(73) Assignee: Mitsubishi Denki Kabushiki Kaisha, Toyko (JP)

( * ) Notice: Subject to any disclaimer, the term of this patent is extended or adjusted under 35 U.S.C. 154(b) by 0 days.

(21) Appl. No.: 10/517,009

(22) PCT Filed: May 14, 2003

(86) PCT No.: PCT/JP03/06014

§ 371 (c)(1),
(2), (4) Date: Dec. 6, 2004

(87) PCT Pub. No.: WO2004/102290

PCT Pub. Date: Nov. 25, 2004

(65) Prior Publication Data

US 2005/0215176 A1    Sep. 29, 2005

(51) Int. Cl.
B24B 1/00 (2006.01)
(52) U.S. Cl. .................... 451/5; 451/9; 451/10; 451/11
(58) Field of Classification Search .................... 451/5, 451/9, 10, 11
See application file for complete search history.

(56) References Cited

U.S. PATENT DOCUMENTS

| 4,136,390 A * | 1/1979 | Farrell et al. ................ 700/164 |
| 5,539,172 A * | 7/1996 | Takase et al. .............. 219/69.2 |
| 6,511,364 B1 * | 1/2003 | Ido et al. ....................... 451/10 |
| 6,591,148 B1 * | 7/2003 | Masuda et al. ............... 700/61 |

FOREIGN PATENT DOCUMENTS

| JP | 05-123939 A | 5/1993 |
| JP | 6-342304 A | 12/1994 |
| JP | 7-334223 A | 12/1995 |
| JP | 8-118213 A | 5/1996 |
| JP | 09-155676 A | 6/1997 |

* cited by examiner

*Primary Examiner*—Eileen P. Morgan
(74) *Attorney, Agent, or Firm*—Sughrue Mion, PLLC

(57) ABSTRACT

A chopping control process, for controlling a machine tool during chopping, i.e., shaping or cutting a workpiece, is allowed without adding an extra axis dedicated just to the chopping, i.e., a chopping dedicated axis. To correct a chopping operation (i.e., an operation of shaping or cutting a workpiece), for a movement error in the contour control (i.e., control of contour along which the workpiece is cut) with a positioning axis or rotation axis, an interpolation processing part 12 and an axis control processing part 13 are provided with a function of generating the movement data for performing the chopping operation by controlling two or more axes at the same time and a function of correcting the chopping operation.

5 Claims, 10 Drawing Sheets

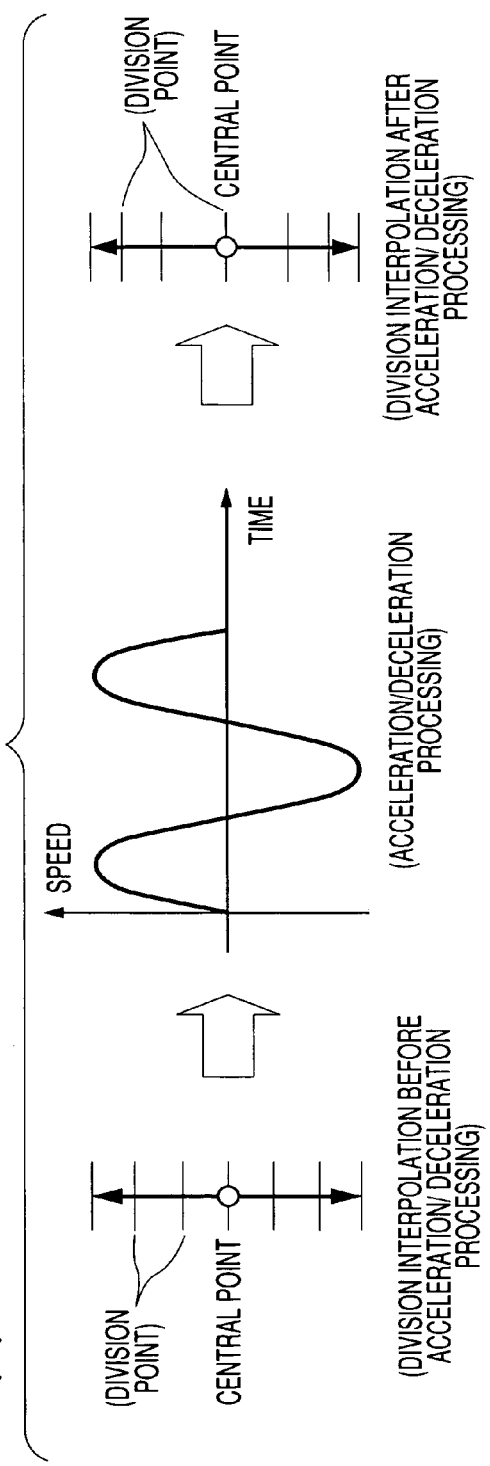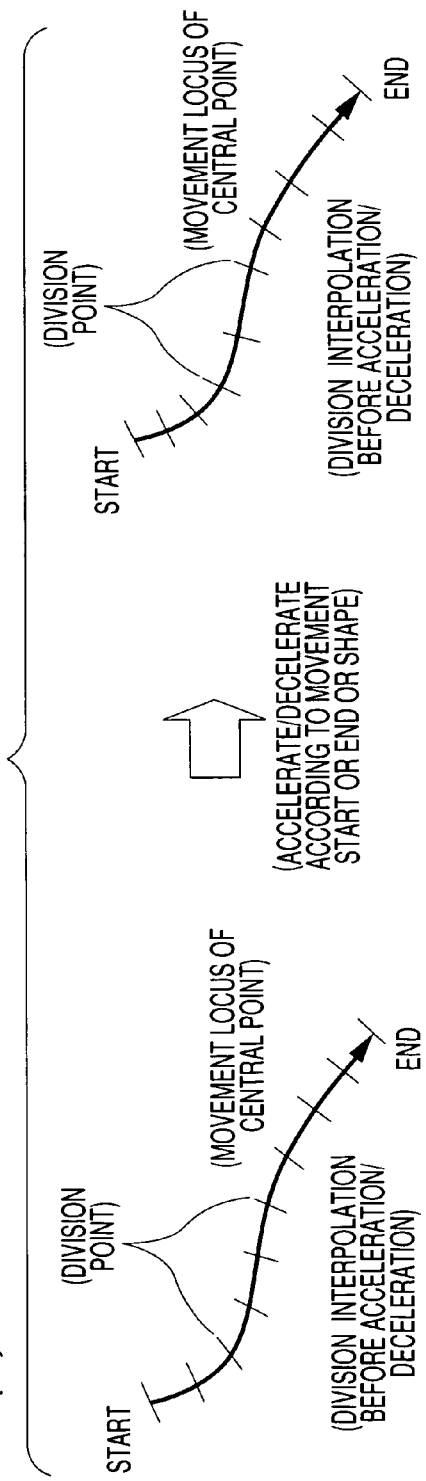

NUMERIC CONTROLLER

TECHNICAL FIELD

The present invention relates to a numerical control apparatus for controlling a machine tool via a chopping control, and more particularly to the so-called chopping control for controlling a chopping operation for shaping or cutting a workpiece with the reciprocating movement in any direction at any period and amplitude in accordance with a commanded processing pulse.

BACKGROUND ART

The conventional numerical control apparatus involved making individually a contour control, to control a contour along which a workpiece is cut, in the X-Y axis direction and a chopping control for effecting the reciprocating movement at any period and amplitude.

Therefore, when the chopping control process was performed in the reciprocating movement at any period and amplitude in accordance with a commanded pulse, using the numerical control apparatus, a machine tool (e.g., grinding machine) controlled by this numerical control apparatus additionally had a chopping dedicated axis (chopping axis), other than the normal control axis (X axis, Y axis and so on).

When this machine tool is employed under the chopping control of the numerical control apparatus, the necessary information for the chopping operation, such as the amplitude (positions of top dead point and bottom dead point) and the reciprocating movement period necessary for the chopping control, are set in advance as the parameters. Then, the chopping axis (e.g., about which the grinding stone is operated) is positioned vertically along the Z axis for the contour locus on the X-Y plane (horizontal plane), and reciprocated in the Z axis direction, in which a table with the workpiece laid is moved in the X-Y axis direction along the control axis to make the contour control, so that the chopping control process is performed with the contour commanded in the processing program, as shown in FIG. 10.

Also, when the chopping control process was performed in a state where the processing face of the workpiece was inclined, as shown in FIG. 11, using the numerical control device, the machine tool was provided with a rotatable chopping axis for making the chopping operation in the state where the workpiece was inclined at a predetermined angle and a rotation axis (C axis) around which the grinding stone was rotated perpendicularly to the processing face on a mechanism for moving the grinding stone along the control axis in the X-Y axis direction.

The machine tool as shown in FIG. 11 performs the chopping control process by making the reciprocating operation and rotational operation for the workpiece (chopping axis) in the arrow direction in the state where the workpiece is inclined, as well as causing the grinding stone held perpendicular to the processing face by rotating the rotation axis (C axis) to be moved in the arrow direction by adjusting the control axis in the X-Y axis direction.

By the way, the conventional numerical control apparatus performed individually the contour control in the X-Y axis direction and the chopping control for making the reciprocating operation in any direction at any period and amplitude, as described above. Therefore, the machine tool with the conventional numerical control apparatus capable of the chopping control process required a dedicated chopping axis for realizing the chopping operation in the reciprocating movement, separately from the control axis for contour control.

Also, in the machine tool with the numerical control apparatus for realizing the chopping operation in any oblique direction as shown in FIG. 11, the rotation axis (C axis) for rotating the tool perpendicularly to the processing face was required, other than the dedicated chopping axis.

In this connection, in the machine tool with the numerical control apparatus capable of the chopping control process, the machine constitution having the chopping axis mounted on a group of contour control axes is required, resulting in a problem with the adjustment or maintenance for the complicate mechanical constitution.

Also, in the machine tool for realizing the chopping operation in any oblique direction as shown in FIG. 11, the rotation axis (C axis) is further required other than the chopping axis. Hence, various problems arise with the manufacturing cost and superposition in the mechanical aspect, as compared with the machine as shown in FIG. 10.

Moreover, since it is permitted to correct the chopping operation for an error (e.g., when the period is faster, the actual amplitude is shorter than the predefined amplitude due to a delay of servo control) only with the chopping axis, there was a problem on the control that it was difficult to correct the chopping operation for a movement error in the contour control with the positioning axis or rotation axis.

DISCLOSURE OF THE INVENTION

The present invention has been achieved to solve the above-mentioned problems, and it is an object of the invention to provide a numerical control apparatus in which the machine tool making the chopping control process does not require the dedicated chopping axis.

Also, it is another object of the invention to provide a numerical control apparatus that can correct the chopping operation for a movement error in the contour control with the positioning axis or rotation axis.

In order to accomplish the above object, a numerical control apparatus of the invention comprises chopping movement data generating means for generating the movement data for making the chopping operation by controlling the two or more control axes at the same time.

Therefore, the machine tool making the chopping control process does not need the dedicated chopping axis.

Also, a numerical control apparatus of the invention comprises chopping movement data generating means for generating the movement data for making the chopping operation by controlling two or more control axes at the same time while making the contour control.

Also, in this invention, the chopping movement data generating means generates the movement data for making the chopping operation for the control axes at the same time while making the contour control in such a manner as to convolute the movement data for making the chopping operation and the movement data for making the contour control, and distribute the convoluted data to each of the control axes.

Therefore, the machine tool making the chopping control process does not need the dedicated chopping axis, and the chopping control is easily adapted to the shape of workpiece and the processing conditions.

Also, the numerical control apparatus of the invention further comprises correction means for correcting a servo delay of each control axis to make the chopping operation at the same time while making the contour control.

Also, in this invention, the correction means corrects a servo delay of each of two or more control axes to make the chopping operation at the same time while making the contour control in such a manner as to acquire a servo delay amount of each control axis by comparing the actual position feedback information for each control axis making the chopping operation at the same time while making the contour control with a command value, synthesize the acquired servo delay amount of each control axis, and distribute the synthesized servo delay amount to a chopping interpolation vector and a contour control interpolation vector.

Therefore, it is possible to correct the chopping operation for a movement error in the contour control with the positioning axis or rotation axis, and make the chopping operation at high precision.

Also, in this invention, a chopping operation initiation command and a chopping operation stop command are issued from any one of a processing program and a ladder portion.

Therefore, the chopping operation initiation command and the chopping operation stop command are issued from any one of the processing program and the ladder portion, whereby the chopping control initiation or stop is easily made.

Also, in this invention, various data regarding the chopping operation command are set as the parameters in a memory, and when the chopping operation initiation command is issued, the chopping control is performed using various data regarding the chopping operation command set as the parameters.

Therefore, when the chopping operation command is issued from the processing program, it is only necessary to describe a chopping initiation command code, whereby the processing program is simplified. Also, various data regarding the chopping operation command are appropriated for some other processing, and various data regarding the chopping operation command are easily modified, whereby the preparation time before processing is shortened.

BRIEF DESCRIPTION OF THE DRAWINGS

FIGS. 5(a) and 5(b) are views showing an acceleration or deceleration process for oblique chopping in an acceleration or deceleration processing part according to the embodiment 1 of the invention.

BEST MODE FOR CARRYING OUT THE INVENTION

Embodiment 1

Referring to FIGS. 1 to 9, an embodiment 1 of the present invention will be described below.

Figure 11:
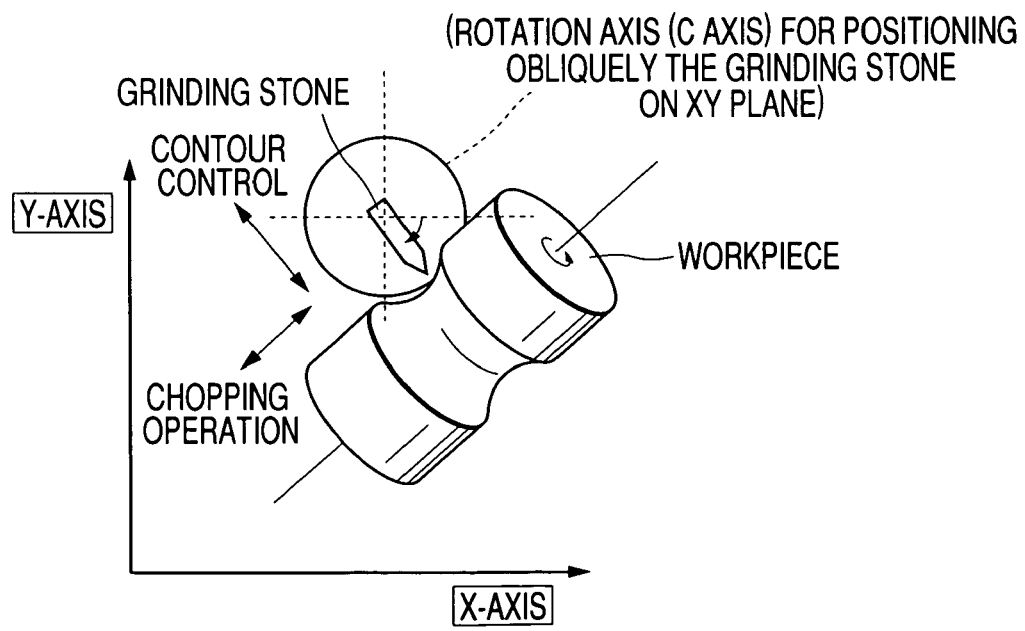
FIG. 11 is a view showing another conventional chopping control process (chopping control process in the oblique direction).

In this embodiment 1, the chopping control process is performed in a state where a processing face of the workpiece is inclined, as shown in FIG. 11.

Figure 1:
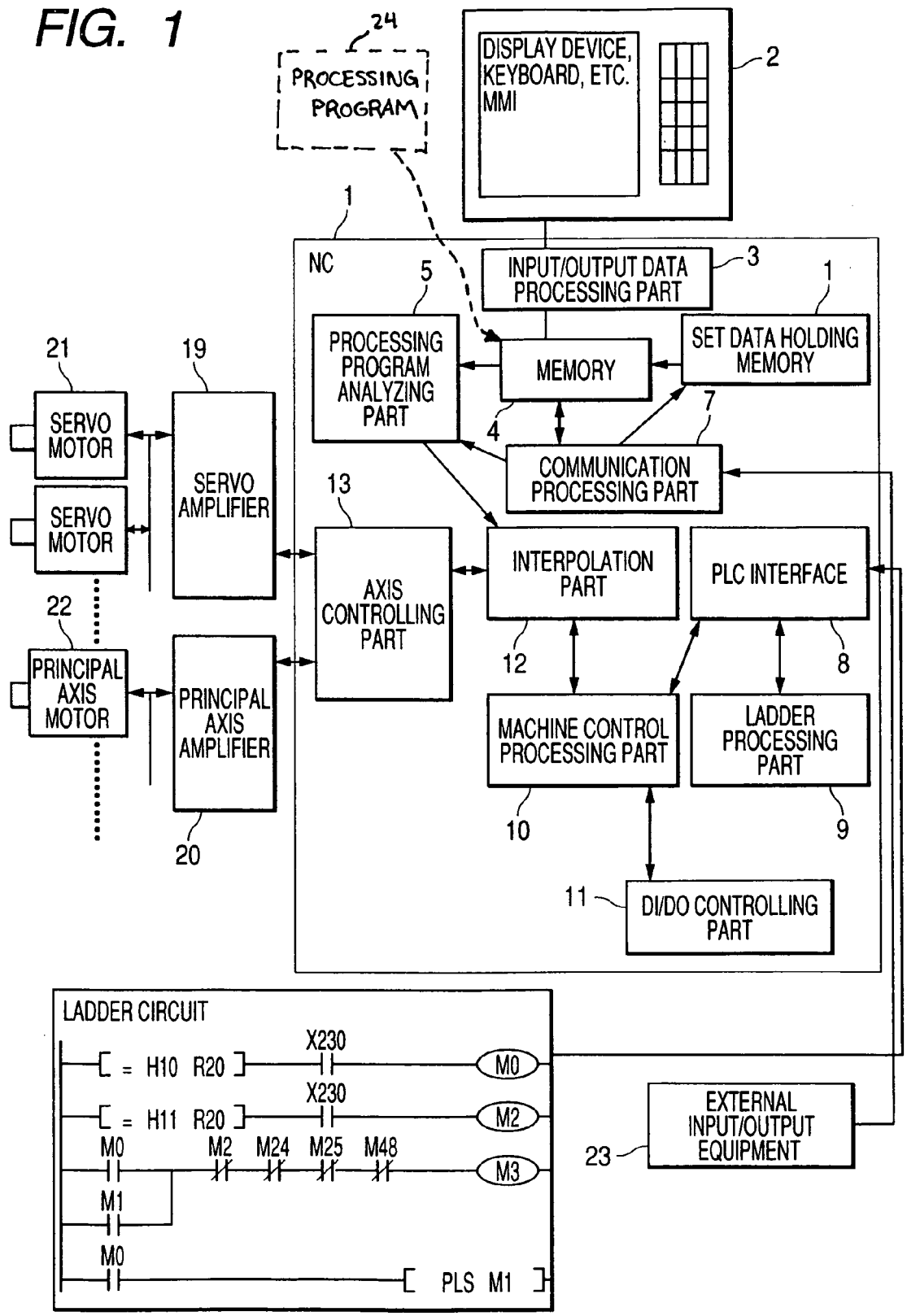
FIG. 1 is a block diagram of a numerical control apparatus according to an embodiment 1 of the present invention.
Figure 2:
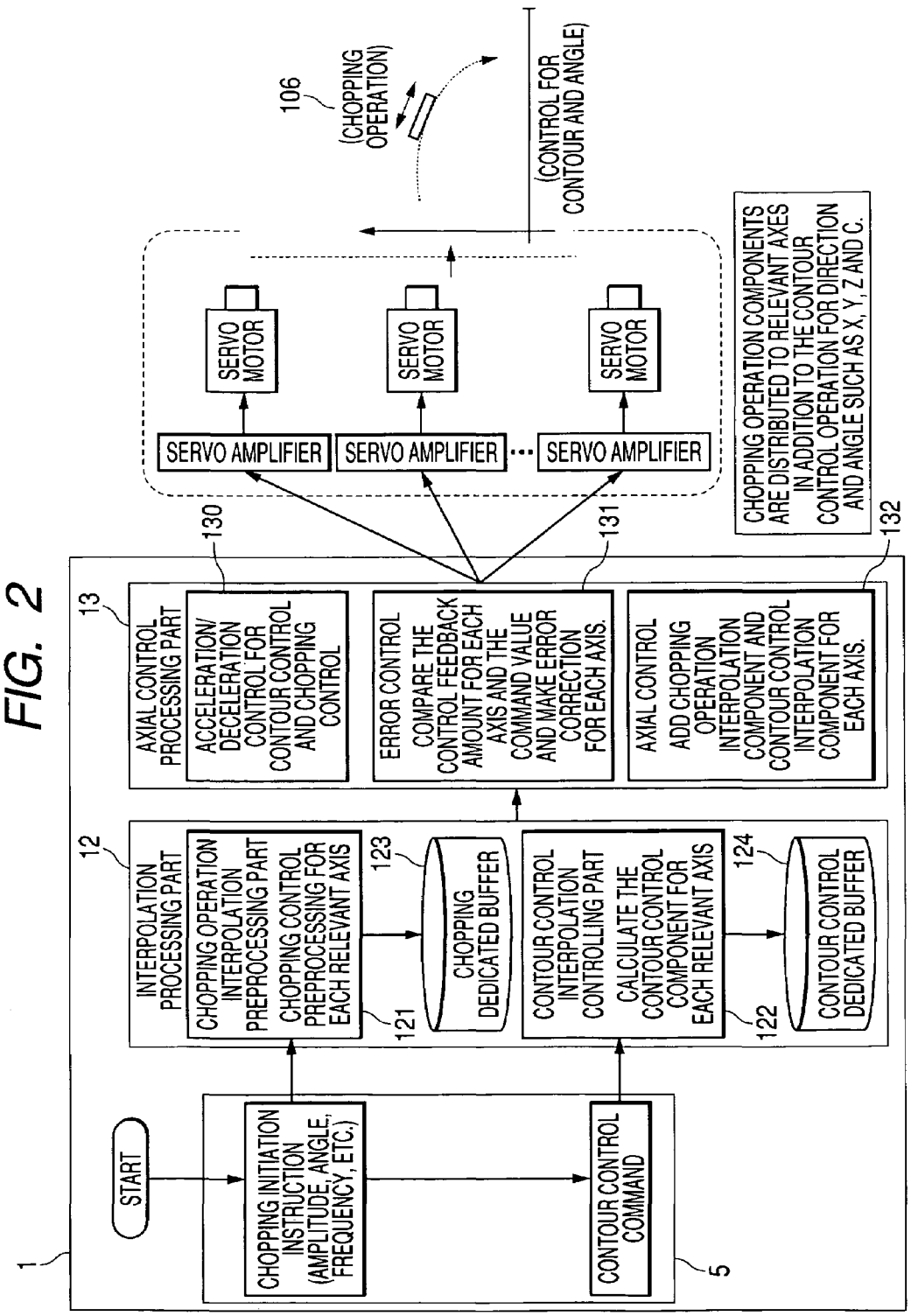
FIG. 2 is a detailed block diagram of the essence of FIG. 1 according to the embodiment 1 of the invention.

FIG. 1 is a block diagram of a numerical control apparatus, and FIG. 2 is a detailed block diagram of the essence of FIG. 1. In the figures, a processing program 24 or the setting data such as parameters input from an external input/output unit 23 via a man machine interface (MMI) 2 such as a display device or a keyboard is stored in a program memory 4 or a setting data holding memory 18 by an input/output data processing part 3 or a communication processing part 7. The parameters include the information related with the oblique chopping operation control according to the embodiment 1 of the invention.

The processing program 24 stored in the memory 4 or directly input from the external input/output unit 23 is analyzed by a processing program analysis processing part 5.

At this time, when a movement command is issued, an interpolation processing is performed in an interpolation processing part 12, the created axial control data being sent to an axial control processing part 13.

The axial control processing part 13 passes the axial control data to a servo amplifier 19 and a principal axis amplifier 20.

As shown in FIG. 2, the interpolation processing part 12 has a chopping operation interpolation preprocessing part 121, a contour control interpolation controlling part 122, a chopping dedicated buffer 123 and a contour control dedicated buffer 124. The axial control processing part 13 has an acceleration/deceleration controlling part 130, an error correction controlling part 131 and an axial controlling part 132. The detailed operation of the interpolation processing part 12 and the axial control processing part 13 will be described later with reference to FIGS. 2 to 9. Also, the interpolation processing part 12 and the axial control processing part 13 constitute chopping movement data creating means and correcting means as referred to in this invention.

The servo amplifier 19 and the principal axis amplifier 20 control a servo motor 21 and a spindle motor 22 connected in accordance with the received axial control data contents.

Also, in the case where data processed in the processing program analysis processing part 5 is an auxiliary command (M command), the data is passed to a machine control processing part 10 to control a machine (ATC control, coolant ON/OFF) under the action of a ladder processing part 9, a PLC interface 8 and a DI/DO controlling part (digital input/output controlling part) 11.

The numerical control apparatus can perform the NC control in accordance with the outside signals input from an input/output controlling part 11 and a built-in ladder program 31, in addition to the NC control performed by the processing program 24 input from the external input/output unit 23 via the man machine interface (MMI) 2 such as an ordinary display device or keyboard as described above. In this case, the NC control is performed by calling the processing program held in the memory 4 through the machine control processing part 10 or upon a command directly issued to the interpolation processing part 12, based on the result processed by the ladder processing part 9 via the PLC interface 8.

Figure 3:
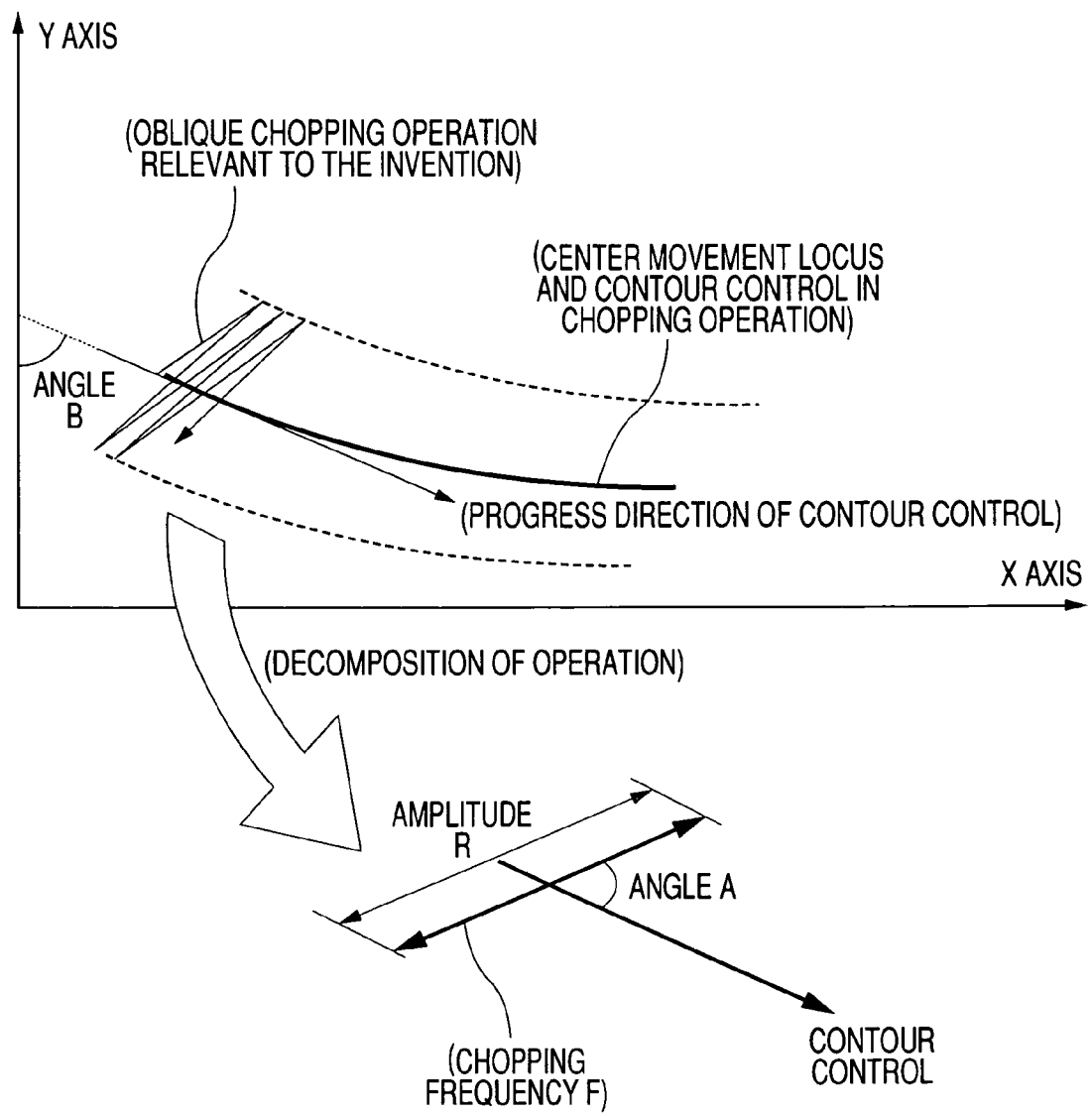
FIG. 3 is a view showing an example of oblique chopping operation according to the embodiment 1 of the invention.

By the way, the oblique chopping control is decomposed into the contour control and the chopping in the operation, as shown in FIG. 3. Also, the operation includes a component of convoluting the contour control on the chopping operation and a component of reciprocating obliquely at arbitrary angle in a rectangular coordinate system as a result, because the chopping operation of reciprocating at a fixed angle to a contour control vector follows variations of the contour control vector.

Therefore, when the decomposed contour control is given a locus and a speed, the chopping control is given at least angle A (angle relative to the vector for contour control), amplitude R and frequency F, and the angle between the vector for contour control and the rectangular coordinates is defined as angle B, synthesizing data, the oblique chopping operation at angle A+B with respect to the rectangular coordinates X-Y.

Hence, the chopping control is enabled only with the control axes of X axis and Y axis originally possessed without adding the chopping dedicated axis to the machine tool.

Referring to FIGS. 2 to 9, the details of the constitution and operation for realizing the chopping operation in oblique direction will be described.

The numerical control apparatus 1 of FIG. 2 is a detailed block diagram in which a relevant portion of the embodiment 1 is excerpted from a block diagram of the numerical control apparatus of FIG. 1.

That is, when the processing program analysis processing part 5 reads and analyzes a contour control command such as G01, G02 from the processing program, various values (block movement start coordinates, end coordinates, speed, acceleration/deceleration pattern and movement locus shape, etc.) regarding the contour control command are passed to the contour control interpolation processing part 122 of the interpolation processing part 12, as shown in FIG. 2. Also, when the processing program analysis processing part 5 reads and analyzes a chopping initiation command or a stop command regarding the chopping operation from the processing program, various values (amplitude, frequency, correction amount for a servo delay in the reciprocating operation) regarding the command are passed to the chopping operation interpolation preprocessing part 121 of the interpolation processing part 12.

The chopping initiation command is given in the processing program in the following format, for example, G . . . R . . . A . . . F . . . P . . . Q . . . : ( . . . : any numerical value)

Where G . . . is a chopping initiation command code, R is amplitude, A is an angle of chopping operation for the movement vector in the contour control, F is a frequency that is the speed of the chopping operation, P is a correction amount measuring method, and Q is a correction amount storing location. Also, the amplitude R, angle A and frequency F command the amplitude R, angle A and frequency F of FIG. 3.

Also, the chopping stop command is given in the following format, for example,

GΔΔ (ΔΔ: any numerical value)

Also, a contour control command is given in the same manner as conventionally.

Figure 4A:
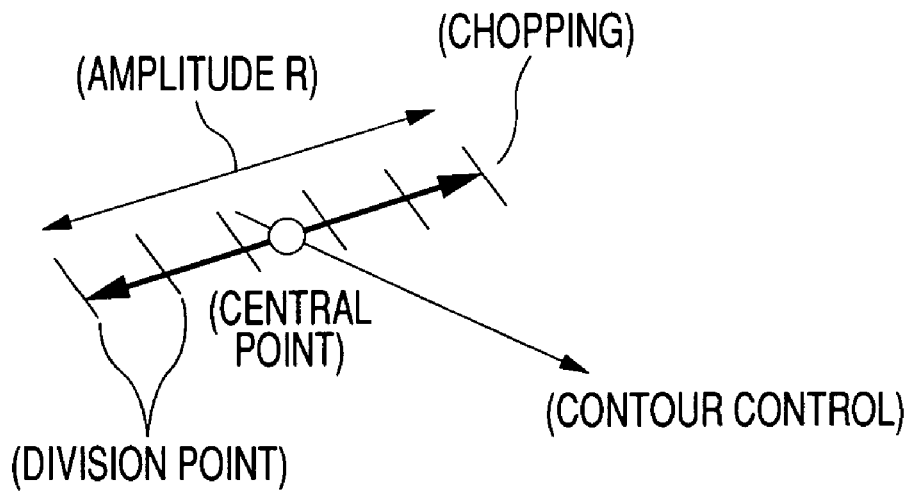
FIGS. 4(a) and 4(b) are views showing an interpolation process for oblique chopping in an interpolation part according to the embodiment 1 of the invention.

The chopping operation interpolation preprocessing part 121 generates an interpolation division point of chopping with reference to the reciprocating central point (contour control point) from various values regarding the chopping operation to be passed, and temporarily saves the generated data in an interpolation data buffer 123 dedicated for chopping, as shown in FIG. 4(a).

Figure 4B:
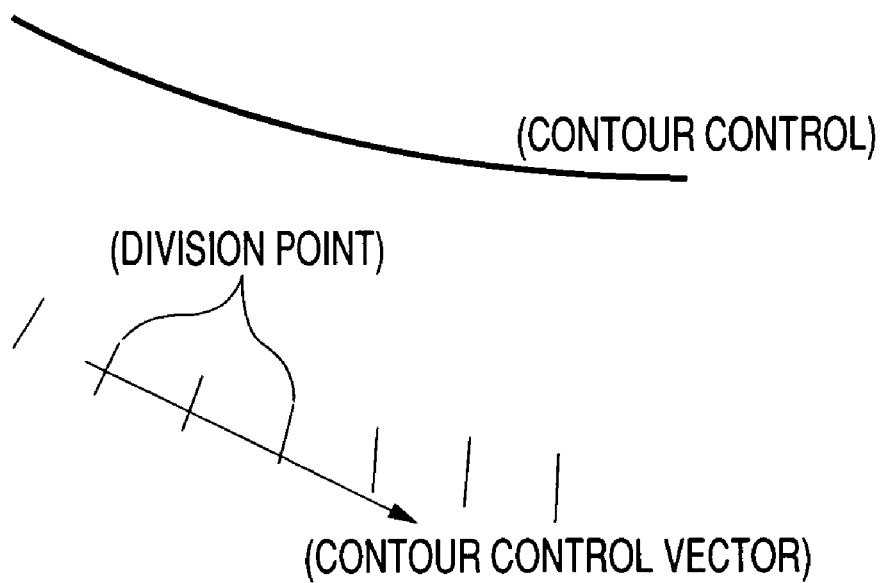

Also, the contour control interpolation controlling part 122 generates an interpolation division point of contour control from various values of contour control, and temporarily saves the generated data in an interpolation data buffer 124 dedicated for contour control, as shown in FIG. 4(b).

The data saved in the interpolation data buffer 123 dedicated for chopping and the interpolation data buffer 124 dedicated for contour control are called in sequence by the next contour control processing part 13. A buffer area the contents of which are used as data is employed as a new data saving area for following generated data.

The axial control processing part 13 has the three internal processing portions, including the acceleration/deceleration controlling part 130, the error correction controlling part 131 and the axial controlling part 132.

The acceleration/deceleration controlling part 130, in the case of chopping control, performs acceleration/deceleration processing for switching the direction of reciprocating chopping operation as shown in FIG. 5(a), using data saved in the interpolation data buffer 123 dedicated for chopping. In the case of contour control, the acceleration/deceleration controlling part 130 performs acceleration/deceleration processing based on the contour control movement start, end and moving shape as shown in FIG. 5(b), using data saved in the interpolation data buffer 124 dedicated for contour control.

Figure 7:
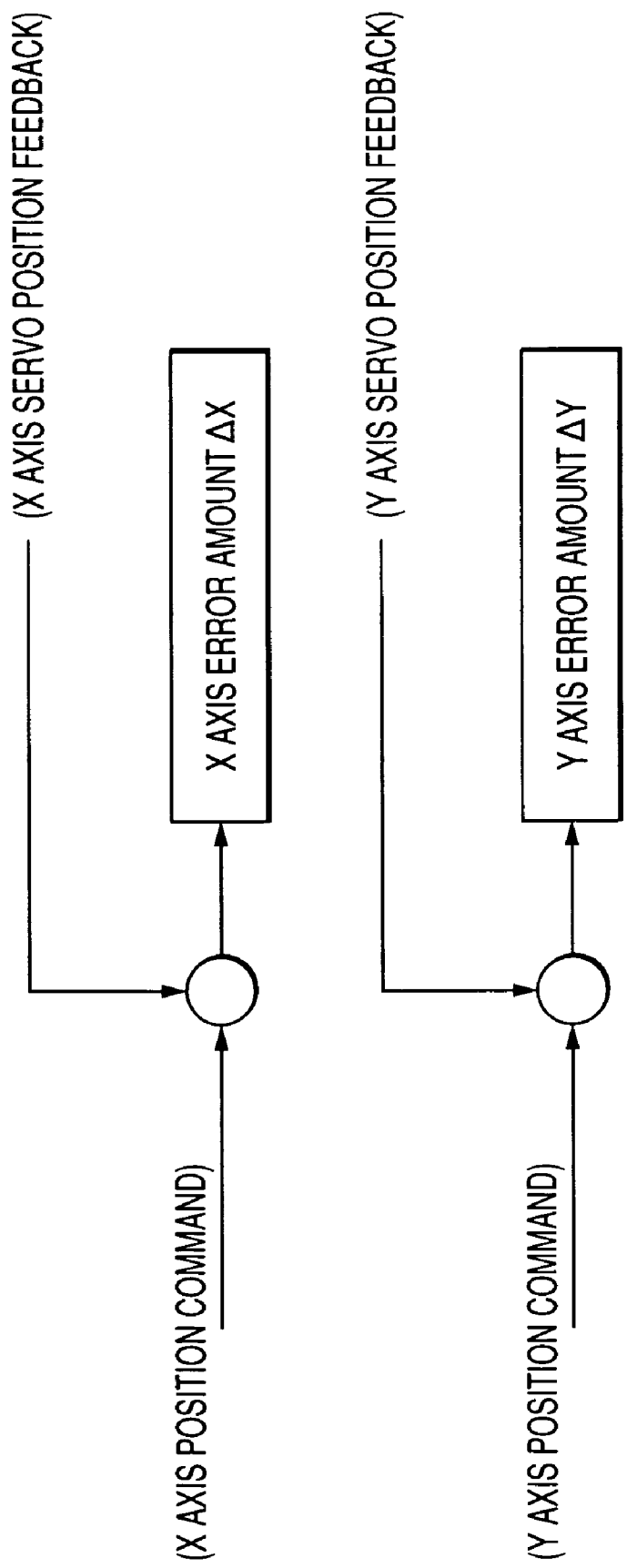
FIG. 7 is a diagram showing an error quantity calculation in the oblique chopping according to the embodiment 1 of the invention.
Figure 8A:
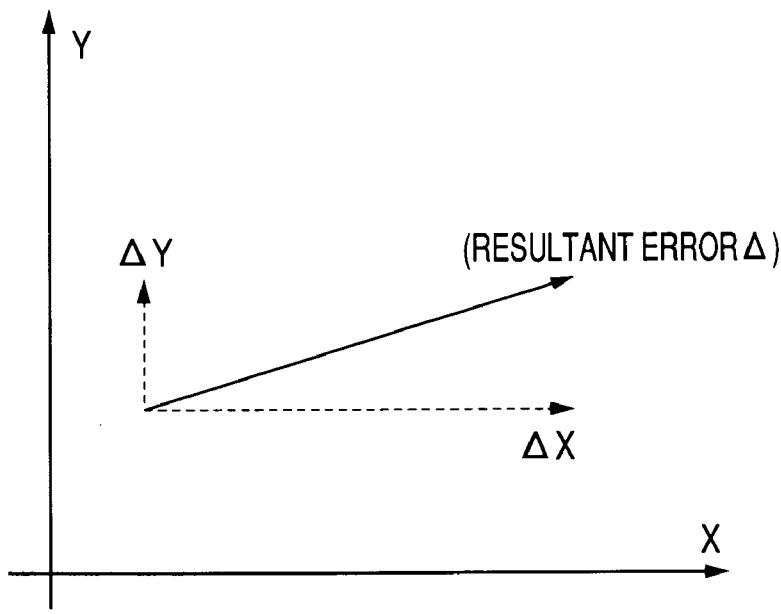
FIGS. 8(a) and 8(b) are views showing a method for dividing an error quantity in the oblique chopping into a chopping error component and a contour control error component according to the embodiment 1 of the invention.
Figure 8B:
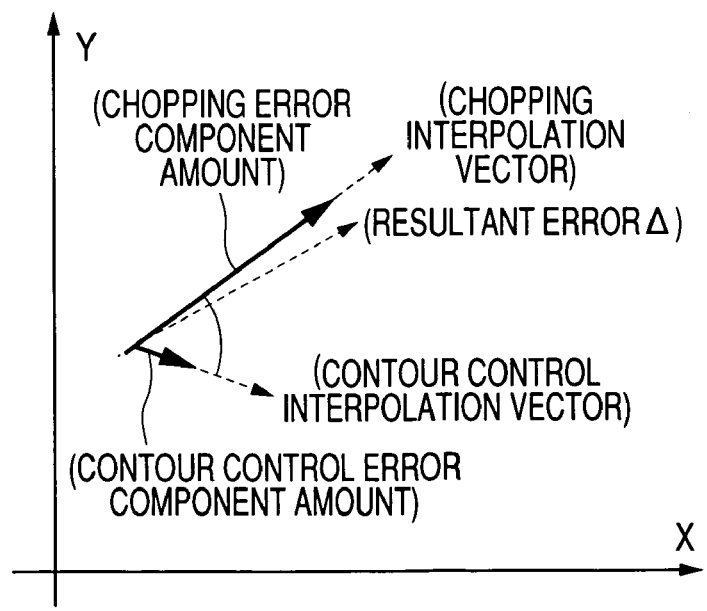

Also, the error correction controlling part 131 corrects for a delay of servo control remarkably appearing at a command position in the case of the fast reciprocating operation such as chopping operation, in which an error amount is calculated for each of a plurality of axes controlled as the oblique chopping operation, as shown in FIG. 7. Moreover, the calculated error amount for each axis is synthesized as shown in FIG. 8(a). This resultant error amount is decomposed into a chopping error component amount and a contour control error component amount, using a chopping interpolation vector and a contour interpolation vector as shown in FIG. 8(b). This decomposed chopping error component amount and contour control error component amount are convoluted on the next oblique chopping command to make the error correction (by correct the next oblique chopping command using the chopping error component amount and the contour control error component amount). Consequently, the error correction is made as shown in FIG. 9.

Figure 9:
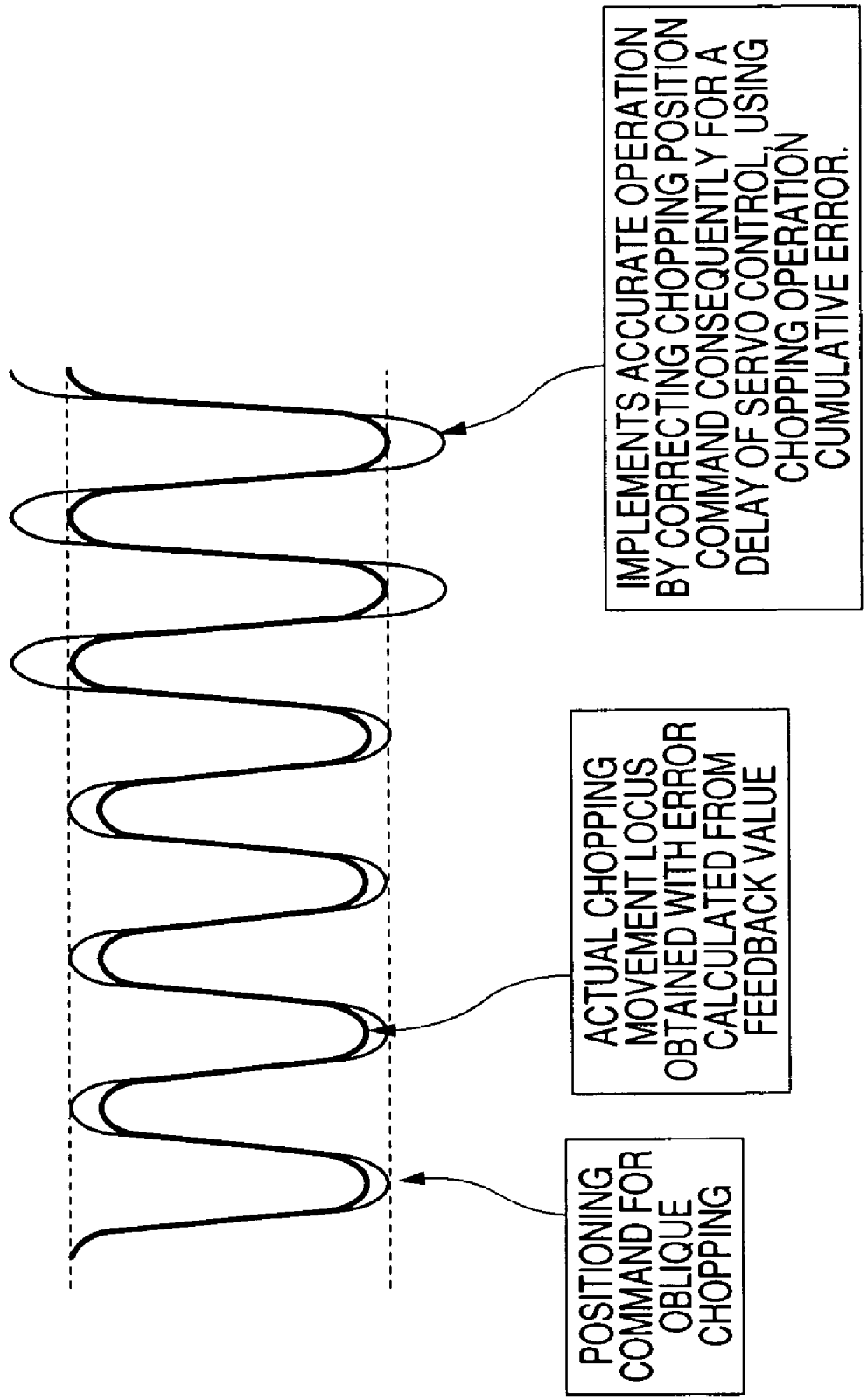
FIG. 9 is a diagram for explaining an error correction in the oblique chopping according to the embodiment 1 of the invention.
Figure 10:
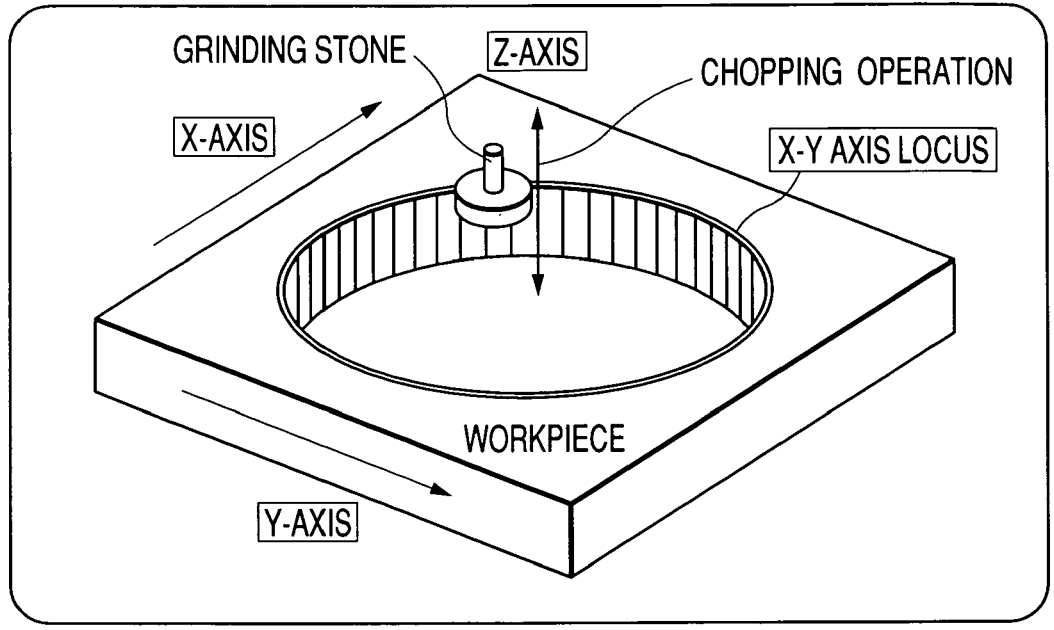
FIG. 10 is a view showing the conventional chopping control process.

This error correction is made using the error amounts at multiple times temporarily saved in the NC internal memory, as shown in FIG. 9.

Figure 6A:
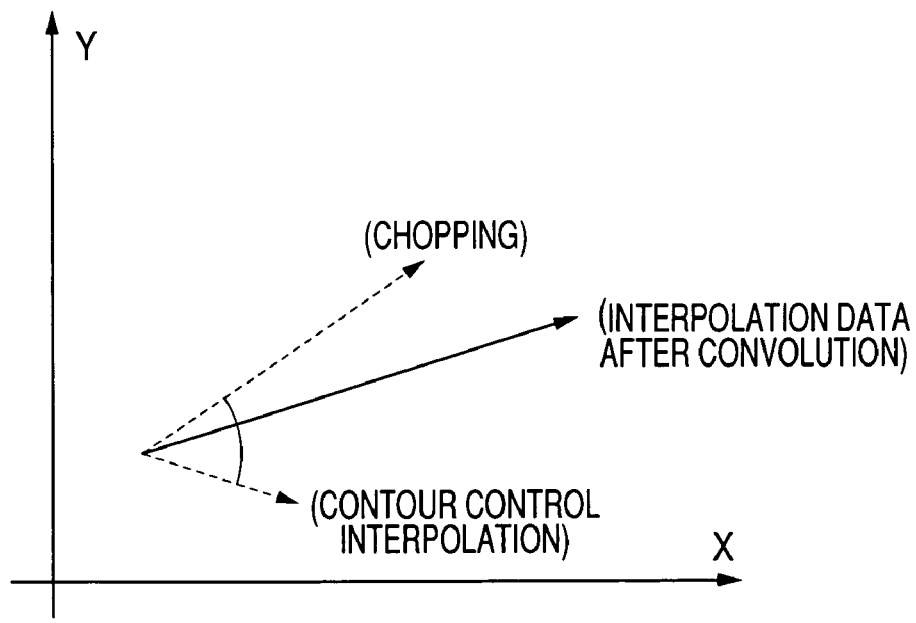
FIGS. 6(a) and 6(b) are views showing the convolution of interpolation data and the axis control in the oblique chopping according to the embodiment 1 of the invention.
Figure 6B:
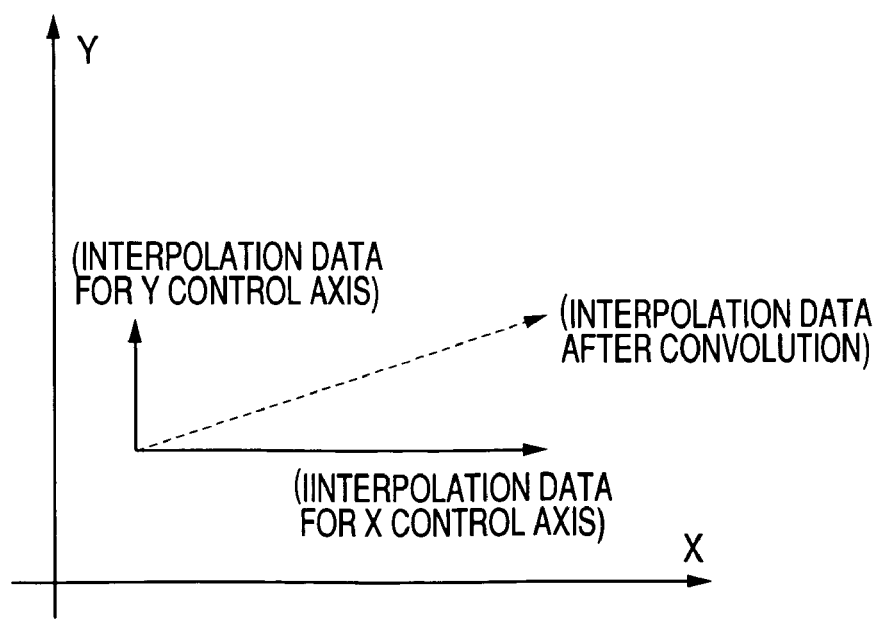

The axial controlling part 132 convolutes the interpolation data for chopping operation and contour control on the chopping interpolation data and the contour interpolation data that are processed by the acceleration/deceleration controlling part 130, and the chopping error correction amount calculated by the error correction controlling part 131, as shown in FIG. 6(a). And the axial interpolation data for each control axis is generated from the convoluted interpolation data as shown in FIG. 6(b), in which each interpolation data is output to each servo amplifier 19 to enable the machine tool to make the chopping control operation.

Also, when the processing program analysis processing part 5 reads the chopping stop command (GΔΔ), the chopping control is stopped, and the contour control is only made.

Accordingly, the chopping control is effected only with the control axes such as the X axis and Y axis originally possessed without adding the chopping dedicated axis to the machine tool in this embodiment 1.

Also, the chopping control is enabled along with the contour control.

In this embodiment 1, to assist an understanding of the invention, the chopping operation is made with two control axes, but may be employed with three or more control axes.

Embodiment 2

In the embodiment 1, various data for controlling the oblique chopping operation, such as G . . . R . . . A . . . F . . . P . . . Q . . . , are commanded from the processing program. However, various data such as R . . . A . . . F . . . P . . . Q . . . may be set and saved as the parameters in the set data holding memory 18 prepared for the numerical control apparatus, but not commanded from the processing program.

In this case, if a chopping operation initiation command of G . . . alone is commanded to the processing program, the processing program analysis processing part 5 reads and analyzes this G . . . , the chopping control is made using various data saved in the set data holding memory 18.

Embodiment 3

In the previous embodiments, the chopping control initiation command and the stop command are issued from the processing program. However, the oblique chopping start and stop commands may be issued directly to the interpolation processing part 12 via the ladder processing part 9, the PLC interface 8 and the machine process controlling part 10 by turning on or off a specific external bit signal based on an outside signal input from the input/output controlling part 11 or by the ladder circuit.

In this case, various data for controlling the oblique chopping operation are set and saved as the parameters in the set data holding memory 18 prepared for the numerical control apparatus, whereby the chopping control is made using various data saved in the set data holding memory 18, when a chopping initiation command is input into the interpolation processing part 12.

INDUSTRIAL APPLICABILITY

As described above, the numerical control apparatus according to this invention is suitably employed for the control of the tool machine making the chopping control process.

The invention claimed is:

1. A numerical control apparatus for controlling a machine tool to shape a workpiece, the numerical control apparatus comprising:
a chopping movement data generating means for performing a contour control, to control a contour along which the workpiece is cut, by controlling two or more control axes, and for generating movement data of the machine tool for performing a chopping operation, for cutting and shaping the workpiece, by controlling said two or more control axes at the same time as performing the contour control, and
correction means for correcting a servo delay of each of said control axes to perform the chopping operation at the same time while performing the contour control,
wherein said correction means corrects the servo delay of each of two or more of said control axes to perform the chopping operation at the same time while performing the contour control, so as to acquire a servo delay amount of each of said control axes by comparing an actual position feedback information for each of said control axes performing the chopping operation at the same time while performing the contour control with a command value, and
wherein, said correction means also synthesizes said acquired servo delay amount of each of said control axes, and distributes said synthesized servo delay amount to a chopping interpolation vector and a contour control interpolation vector.

2. A numerical control apparatus for making a contour control of a machine tool to shape a workpiece, by controlling two or more control axes, the numerical control apparatus comprising:
chopping movement data generating means for generating movement data of the machine tool for performing a chopping operation, for cutting or shaping the workpiece, by controlling said two or more control axes at the same time while performing the contour control to control a contour along which the workpiece is cut, and
correction means for correcting a servo delay of each of said control axes to perform the chopping operation at the same time while performing the contour control,
wherein said correction means corrects the servo delay of each of two or more of said control axes to perform the chopping operation at the same time while performing the contour control, so as to acquire a servo delay amount of each of said control axes by comparing an actual position feedback information for each of said control axes performing the chopping operation at the same time while performing the contour control with a command value, and
wherein, said correction means also synthesizes said acquired servo delay amount of each of said control axes, and distributes said synthesized servo delay amount to a chopping interpolation vector and a contour control interpolation vector.

3. The numerical control apparatus according to claim 2, wherein said chopping movement data generating means generates the movement data for performing the chopping operation for said control axes at the same time while performing the contour control, so as to convolute the movement data for performing the chopping operation on the movement data for performing the contour control, and said chopping movement data generating means distributes said convoluted data to each of said control axes.

4. The numerical control apparatus according to claim 1 or 2, wherein a chopping operation initiation command and a chopping operation stop command are issued from any one of a processing program and a ladder portion.

5. The numerical control apparatus according to claim 1 or 2, wherein various data regarding the chopping operation are set as parameters in a memory, and when a chopping operation initiation command is issued, the chopping control is performed using various data regarding the chopping operation command set as said parameters.

* * * * *